(12) United States Patent
Koga

(10) Patent No.: US 6,556,675 B2
(45) Date of Patent: *Apr. 29, 2003

(54) SUBSCRIBER LINE CONTROL DEVICE

(75) Inventor: Hisashi Koga, Yokohama (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,367

(22) Filed: Jun. 27, 2002

(65) Prior Publication Data

US 2002/0150234 A1 Oct. 17, 2002

(30) Foreign Application Priority Data

Jul. 11, 1997 (JP) ............................... 9-186564

(51) Int. Cl.⁷ ............................................... H04M 1/00
(52) U.S. Cl. .............................. 379/399.01; 379/413.03
(58) Field of Search ............................... 379/399, 280, 379/269; 340/286.02, 506, 508, 825.36, 825.49

(56) References Cited

U.S. PATENT DOCUMENTS 3,965,457 A * 6/1976 Harwood ..................... 379/280
4,283,717 A * 8/1981 Caldwell et al. ............. 340/506
4,393,491 A * 7/1983 Ashlock et al. ............... 379/15

* cited by examiner

Primary Examiner—Forester W. Isen
Assistant Examiner—Jefferey Harold
(74) Attorney, Agent, or Firm—Katten Muchin Zavis Rosenman

(57) ABSTRACT

In a subscriber line control device connected to a plurality of subscriber circuits, there is a memory circuit for recording signal data indicating the states of subscriber lines, and hardware for displaying flags denoting changes in the signal data indicating the states of the subscriber lines, as well as firmware for monitoring periodically the flags displayed by the hardware.

6 Claims, 18 Drawing Sheets

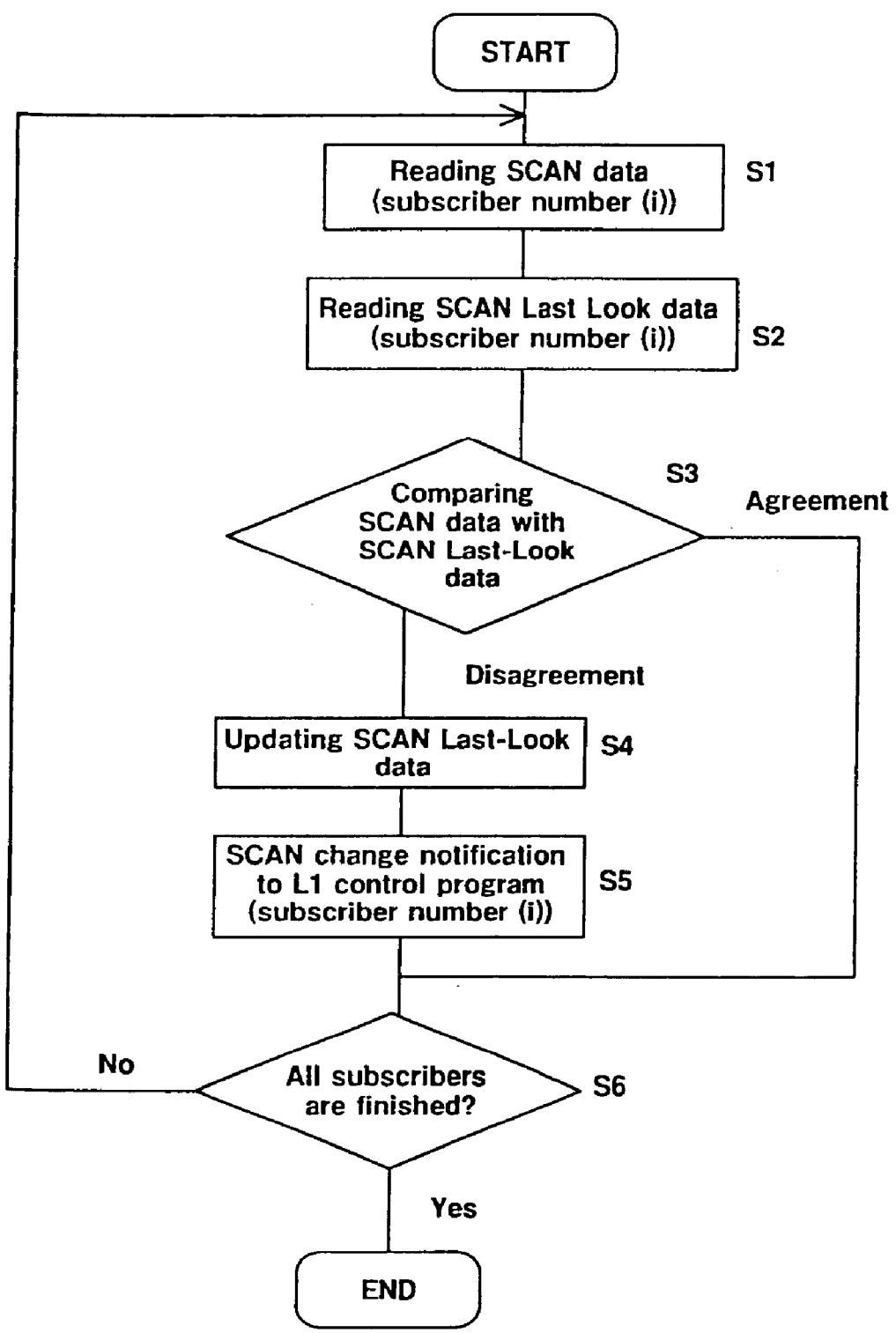

SUBSCRIBER LINE CONTROL DEVICE

BACKGROUND OF THE INVENTION

1. Field of the Invention

The present invention relates to a subscriber line control device in an electronic exchange, and more particularly, to a subscriber line control device including hardware and software for controlling Layer 1 according to transmission line regulations in the physical layer of ISDN subscriber lines.

2. Description of the Related Art

This subscriber line control device is connected to subscriber circuits and controls Layer 1 by means of SD/SCN signals. An SD signal is a transmission signal which conducts relay control for maintenance operations by activating the transmission path forming the physical layer of the subscriber lines. On the other hand, the SCN signal is a signal for indicating subscriber circuit fault information and synchronization between the subscriber circuits and the terminal devices.

FIG. 16 is a structural example of a subscriber control system including a subscriber line control device. This is constituted by a subscriber control shelf 1, a line processor (LPR) 2 and a call processor (CPR) 3. Subscriber line control devices 10 are incorporated in the subscriber control shelf 1.

The subscriber control shelf 1 further comprises circuits 12 providing an interface function with the line processor 2 and call processor 3, and a plurality of subscriber cards 11 (card 0–n). The plurality of subscriber cards 11 are connected respectively to ISDN terminal subscribers by means of terminal devices NTE, and accommodate, for example, eight subscriber circuits. In the configuration illustrated in FIG. 16, the subscriber line control devices 10 form a duplex redundancy structure (#0, #1) and are each connected respectively to a plurality of subscriber cards 11.

In the configuration shown in FIG. 16, only the active subscriber line control devices 10 of the system currently in use communicate with the host (line processor 2 and call processor 3). Therefore, the active subscriber line control devices 10 receive control signals for the subscriber lines from the host, and notify the host of subscriber line faults.

Here, in order to control the plurality of subscriber lines, the subscriber line control devices 10 scan the plurality of subscriber cards 11 in succession, detect state changes in all of the subscribers (for example, 224 subscribers), and transmit these changes to the host. Changes in the SCAN (SCN) signal obtained when the subscriber cards 11 are scanned are also detected periodically by the subscriber line control devices 10 for all the subscribers, by means of firmware.

On the other hand, with the progress of rationalization in recent years, there has been a tendency to increase the number of subscriber cards accommodated by a subscriber control shelf 1. In this case, a problem arises in that the processing load on the firmware increases as the number of subscriber lines rises.

In other words, to explain this with reference to the drawings, FIG. 17 shows a structural example previously developed by the present inventors for application to the subscriber line control devices 10 shown in FIG. 16. In FIG. 17, an SD/SCN control section 100 forming a hardware device, receives SCAN signals from the subscriber cards 11. The SCAN signals received by the SD/SCN control section 100 are transmitted to the SCAN memory 101 where SCAN data (0)–(n) for all the subscribers is recorded successively.

Here the contents of the SCAN data include, for example, fault information for the corresponding subscriber line, subscriber circuit-terminal device synchronization bits, and the like.

FIG. 18 is a flowchart of firmware operations relating to FIG. 17. SCAN data for each subscriber is read from the SCAN memory 101 (step S1), and the SCAN data for the corresponding subscriber referred to last (Last-Look) is read from a firmware memory 102 (step S2).

These respective data items are compared by a firmware comparison process 103 (step S3). If the data do not agree, then the contents of the firmware memory 102 are updated (step S4), and for each subscriber number, a notification is sent to the Layer 1 control program on the subscriber line control device indicating that there has been a change in the SCAN signal (step S5). This processing is carried out for each subscriber (step S6).

The Layer 1 control program conducts Layer 1 activation processing and fault processing on the basis of this notification of change in the SCAN signal. Accordingly, with this configuration there has been a problem in that the firmware processing load increases as the number of subscribers rises.

SUMMARY OF THE INVENTION

Therefore, it is an object of the present invention to resolve the problem of increased firmware processing load when the number of subscribers rises, by providing a subscriber line control device which enables the firmware processing load to be reduced regardless of increases in the number of subscriber lines.

It is a further object of the present invention to provide, in a duplex redundancy configuration of subscriber line control devices (#0, #1), a subscriber line control device which enables the SCAN signal to be carried over to a new ACT system without leakage, when the system is switched.

In a subscriber line control device connected to a plurality of subscriber circuits, the aforementioned objects of the present invention are achieved by providing, a memory circuit for recording signal data indicating the states of subscriber lines, and hardware for displaying flags denoting changes in the signal data indicating the states of the subscriber lines, as well as firmware for monitoring periodically the flags displayed by the hardware.

In one mode, the present invention is characterized in that in the foregoing, there is provided a comparison circuit for comparing signal data indicating the states of the subscriber lines previously recorded in the memory circuit with received signal data indicating the states of the subscriber lines, and when this comparison circuit detects a disagreement, the memory circuit is updated by writing received signal data indicating the state of a subscriber line into the memory circuit, and the aforementioned flag is set as a flag indicating that the signal data has changed.

In a further mode, in the foregoing, when the firmware refers to a flag and the flag indicates that the signal data has changed, the firmware reads out the corresponding signal data written into the memory.

In yet a further mode, when the comparison circuit has detected a disagreement, if the corresponding flag is one which indicates that the signal data has changed, then neither the process of updating the signal data in the memory circuit, nor that of changing the flag, are implemented.

Moreover, a FIFO memory is provided, and this FIFO memory indicates the location in the memory circuit where the received signal data is to be written, when the comparison circuit detects a disagreement.

Yet further, in the foregoing, the location indicated in the FIFO memory is decremented when the firmware has read the signal data in the memory circuit, and it is incremented when the comparison circuit detects a disagreement.

Using an active and stand-by duplex configuration in a subscriber line control device connected to a plurality of subscriber circuits, the present invention is characterized in that it comprises, as hardware components, memory circuits for recording signal data indicating the states of subscriber lines, for an active system and a stand-by system, respectively, and means for displaying flags denoting changes in this signal data indicating the states of the subscriber lines, as well as firmware for monitoring periodically the flags displayed by the display means, and the active system rewrites and updates the current and stand-by memory circuits, when this flag display means indicates that there has been a change in the signal data indicating the states of the subscriber lines, and the stand-by system periodically rewrites the flags for all subscribers as flags indicating that there has been no change in signal data.

In the foregoing, in one mode, the stand-by system rewrites the memory circuit unconditionally when a flag indicates that there has been a change in signal data.

BRIEF DESCRIPTION OF THE DRAWINGS

FIG. 18 is a flowchart of firmware processing relating to FIG. 17.

DESCRIPTION OF THE PREFERRED EMBODIMENTS

Figure 1:
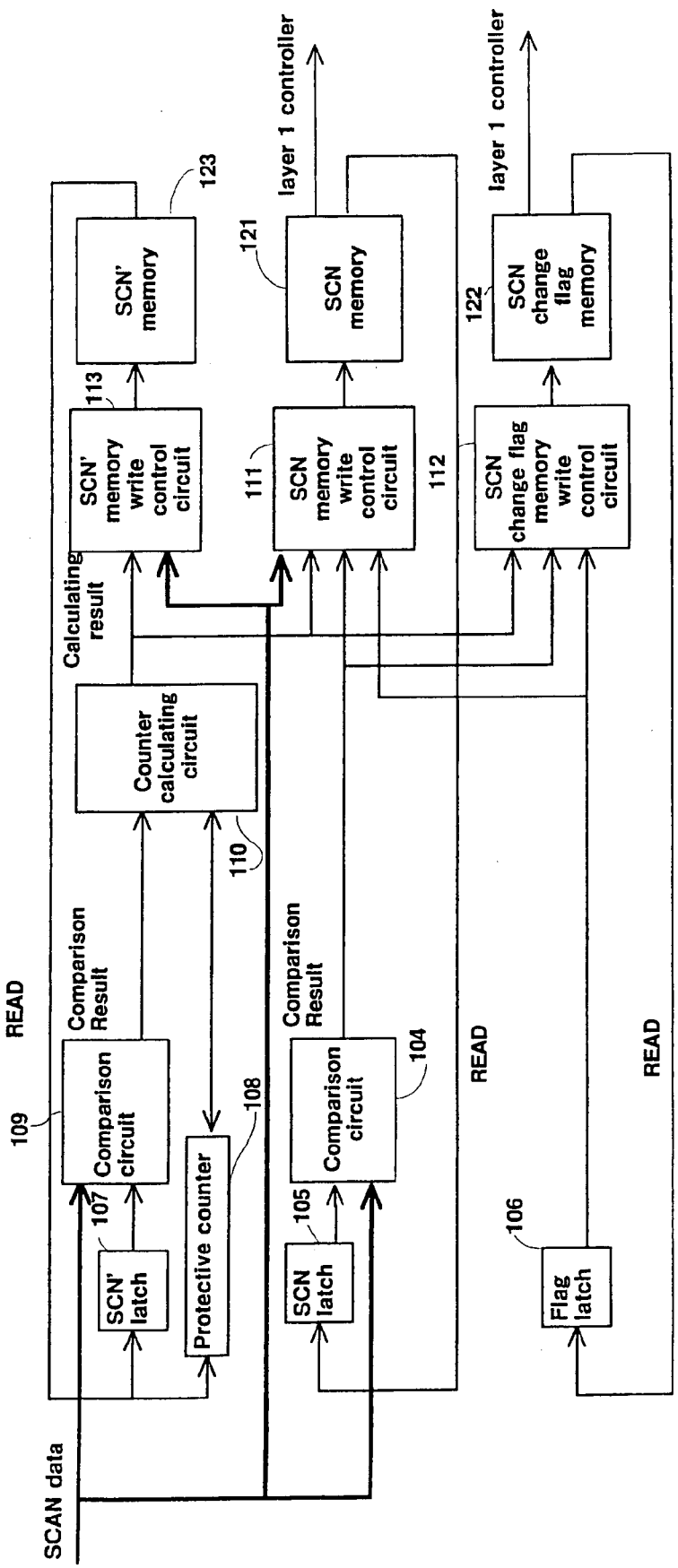
FIG. 1 is a block diagram of a first mode of implementing a subscriber line control device according to the present invention.

Below, modes for implementing the present invention are described with reference to the drawings. In the drawings, elements which are the same or similar are labelled with the same reference number or reference symbol.

Figure 17:
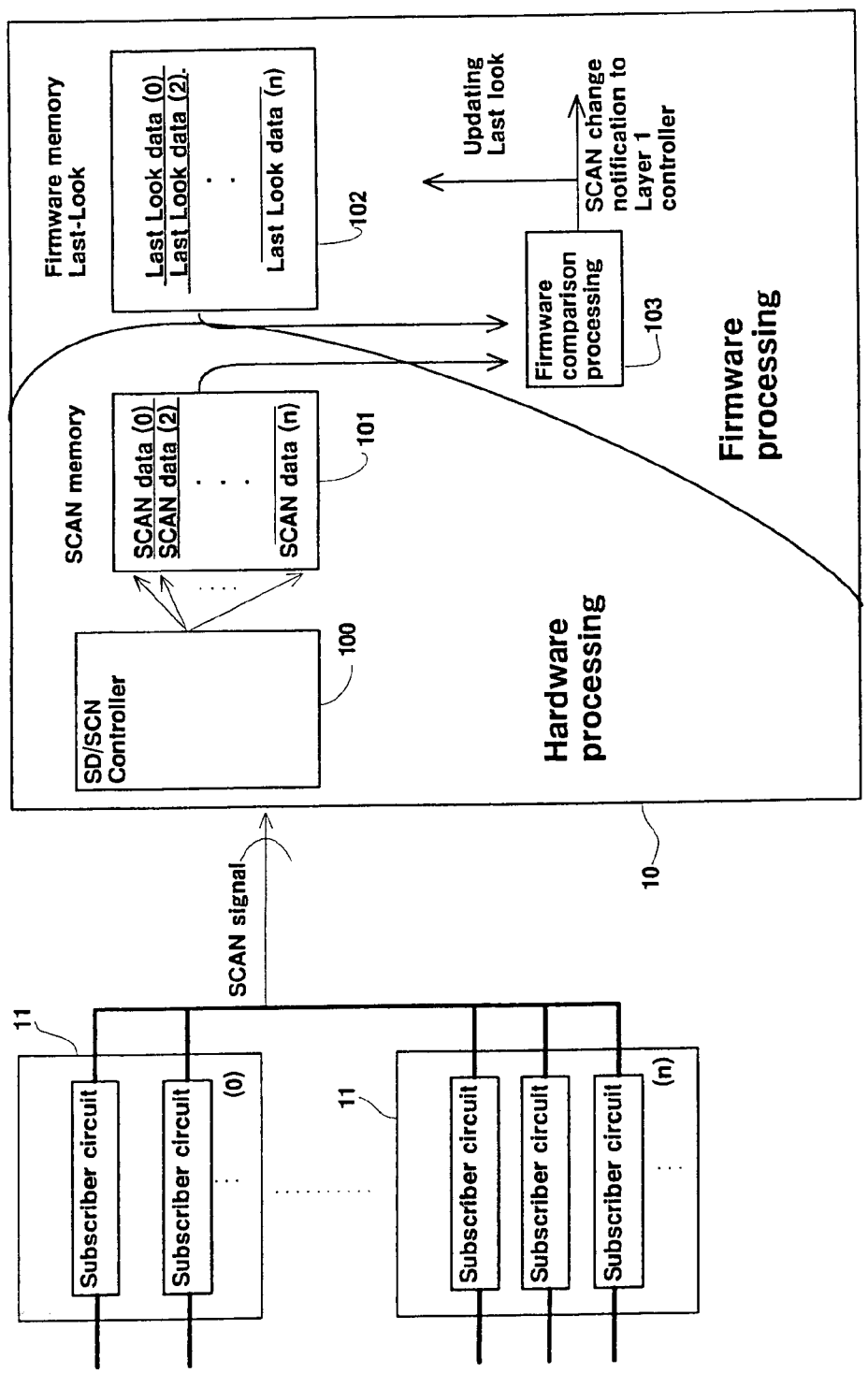
FIG. 17 is a diagram illustrating a compositional example previously developed by the present inventors and applied to the subscriber line control device 10 in FIG. 16.

FIG. 1 is a block diagram of a first mode for implementing a subscriber line control device according to the present invention. In the composition in FIG. 17 described above, the SCAN signal is written directly into the SCAN memory 101 and changes in the SCAN signal are detected by firmware processing 103. By contrast, in the composition in FIG. 1, changes in the SCAN signal are detected by hardware.

In specific terms, as shown in FIG. 1, there are provided a SCAN memory 121 which is a memory circuit recording SCAN signal data for each subscriber, and a SCN change flag memory 122 which records flags indicating whether or not there has been a change in the SCN signal for each subscriber.

Write control circuits 111, 112 are provided respectively for the SCAN signal data memory circuit 121 and SCN change flag memory 122. SCAN signal data obtained by scanning the subscriber circuits is input to a comparison circuit 104. The previously recorded (Last-Look) SCAN signal data is read out from the SCAN memory 121 and latched by a SCAN signal latch circuit 105.

Therefore, the comparison circuit 104 compares the input SCAN signal data with the output from the latch circuit 105 and outputs a comparison result. This result is transmitted to the write control circuit 111 controlling the input to SCAN memory 121, and the write control circuit 112 controlling the input to SCN change flag memory 122.

Thus, according to the composition in FIG. 1, in the present invention the basic concept is that the change flag is set to ON "1" and the SCAN memory 121 data is updated, when the comparison circuit 104 detects a disagreement between the (Last-Look) SCAN signal data and the received SCAN signal data. In the mode of implementation illustrated in FIG. 1, moreover, measures can be taken with regard to the absorption of SCAN signal noise when detecting changes in the SCAN signal, as well as compatibility with firmware processing, which is described later.

In order to absorb noise in the SCAN signal when a change in the SCAN signal is detected, the composition in FIG. 1 includes: a protective counter memory 123 which is similar to the SCAN memory 121 and stores (Last-Look) SCAN signal data; a write control circuit 113 which controls writing to protective counter memory 123; a latch circuit 107 which latches the (Last-Look) SCAN signal data read out from the protective counter memory 123; a comparison circuit 109 for comparing the output from the latch circuit 107 with the received SCAN signal data; a protective counter 108 and a counter calculating circuit 110.

Figure 2:
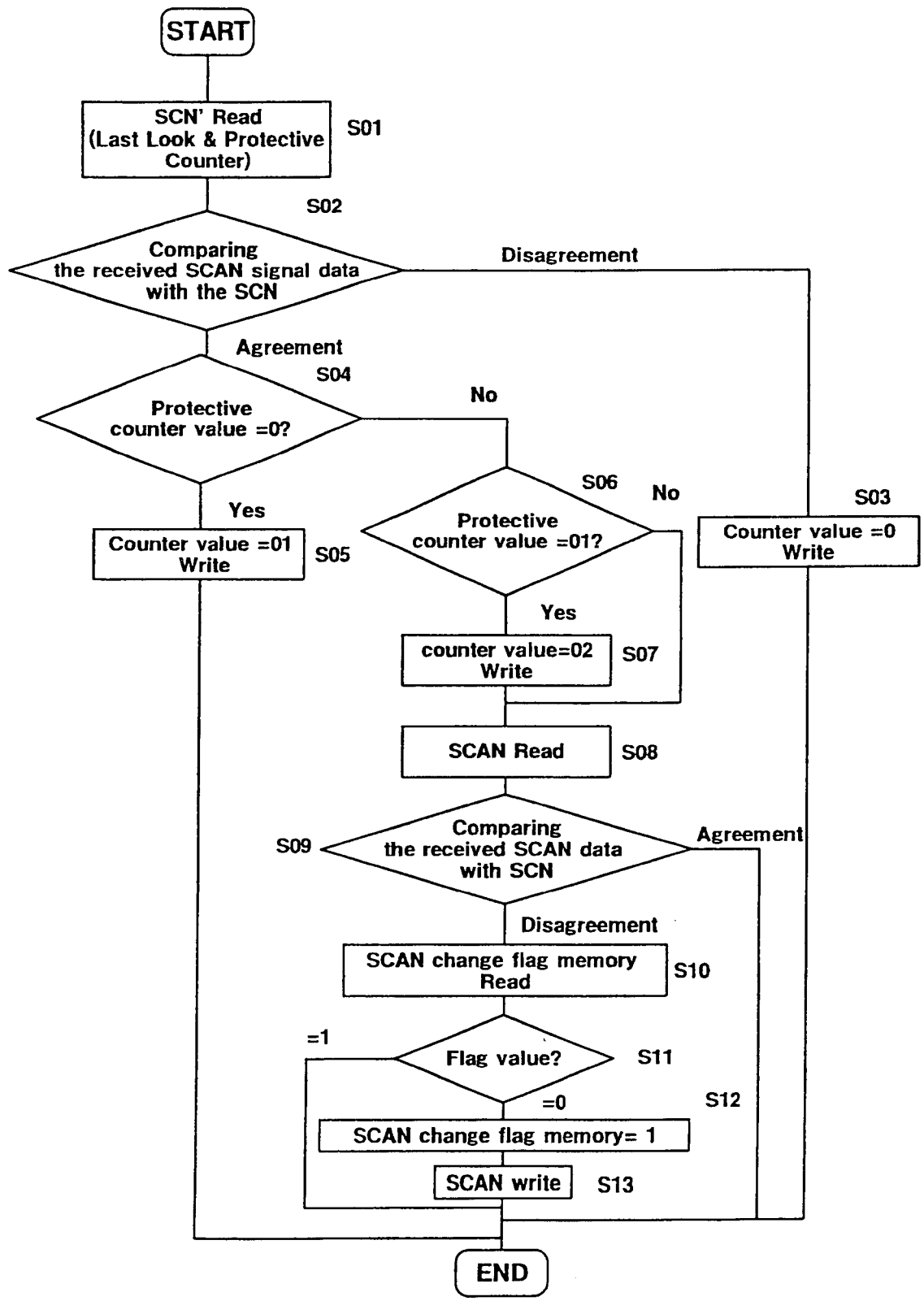
FIG. 2 is a flowchart of hardware logic operations in the mode of implementation in FIG. 1.
Figure 3:
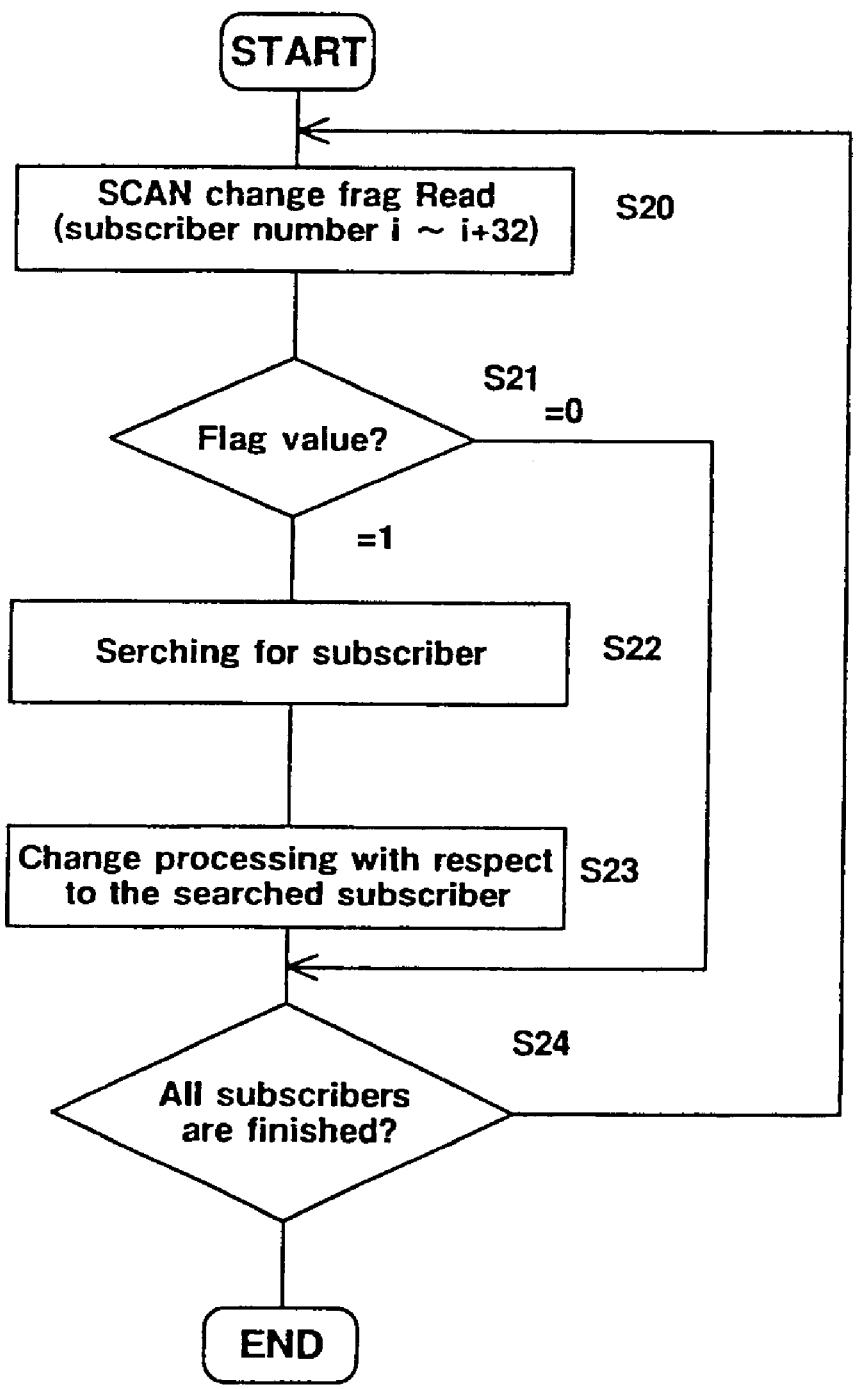
FIG. 3 is a flowchart of firmware logic operations in the mode of implementation in FIG. 1.

FIG. 2 and FIG. 3 are flowcharts of hardware logic operation and firmware operation, respectively, according to the mode of implementation illustrated in FIG. 1. In FIG. 2, when SCAN signal data is received, in order to absorb SCAN signal noise, the (Last-Look) SCAN signal data is read out from the protective counter memory 123 (step S01), and is latched by the latch circuit 107. The comparison circuit 109 then compares the received SCAN signal data with the output from the latch circuit 107 (step S02).

If this comparison produces a disagreement, "0" is written into the protective counter 108. If the data agree, then it is judged whether or not the value of the protective counter 108 is "0". If it is "0", then "1" is written into the protective counter 108 (step S05).

At step S04, if the value of the protective counter 108 is not "0", then it is judged whether or not it is "1" (step S06). If it is "1", then the value "2" is written into the protective counter 108 (step S07), and the (Last-Look) SCAN signal is read from the SCAN memory 121 and latched by the SCAN latch circuit 105 (step S08). At step S06, if the value of the protective counter 108 is not "1", then it is "2", so step S08 is implemented in this case also.

In the foregoing, the counter calculating circuit 110 is used to determine the value of the protective counter 108 and to control the input of values "0", "1" and "2" to the protective counter 108, depending on the conditions. The counter calculating circuit 110 also supplements the SCAN memory write control circuit 111, when the value of the protective counter 108 is "2" (step S06: No), and when value "2" is written into the protective counter 108 (step S07), since it is able to read the (Last-Look) SCAN signal data from SCAN memory 121.

Therefore, since the reading out of the (Last-Look) SCAN signal data is delayed until the protective counter 108 reaches "2", it is possible to absorb noise in the SCAN signal.

In FIG. 2, the comparison circuit 104 compares the received SCAN signal data with the output of the SCAN latch circuit 105 (step S09). The comparison result is transmitted to the SCAN memory the write control circuit 111 and the write control circuit 112 to control the SCAN change flag memory 122.

At step S09, if the comparison result is an agreement, then no action is taken, since the SCAN signal data has not changed. On the other hand, if the comparison result is a disagreement, this indicates that the SCAN signal data has changed. Therefore, in this case, it is necessary to update the SCAN memory 121 by writing in the newly received SCAN signal data.

However, in cases where there is (Last-Look) SCAN signal data which has not yet been read by the firmware side, a conflict with the firmware arises. Therefore, a SCAN change flag is read out from the SCAN change flag memory 122 (step S10). The SCAN change flag read out from the SCAN change flag memory 122 is latched by the latch circuit 106. The value of the SCAN change flag latched by the latch circuit 106 is determined by the SCAN change flag memory write control circuit 112 (step S11). If the flag value is "1", then this indicates that the firmware has already read out and processed the (Last-Look) SCAN signal data. Therefore, no action is taken in this case.

On the other hand, if the flag value is "0", this indicates that the firmware has not yet read out the (Last-Look) SCAN signal data. Therefore, value "1" is written into the SCAN change flag memory 122 (step S12) and at the same time, the received SCAN signal data is written into the SCAN memory 121 (step S13).

In FIG. 3, the firmware operation involves reading out the flag value written into the SCAN change flag memory 122 (step S20). It then determines whether the flag value is "1" or "0" (step S21).

If the flag value is "0", then since there is no change in the SCAN signal data, no processing is implemented. If the flag value is "1", then since there is a change in the SCAN signal data, the firmware searches for the corresponding subscriber number (step S22). It then conducts change processing with respect to the searched subscriber, namely, it indicates the SCAN signal change to the Layer 1 control program. Thereby, Layer 1 is activated and fault processing is initiated (step S23). This processing is conducted for all subscribers (step S24).

Figure 4:
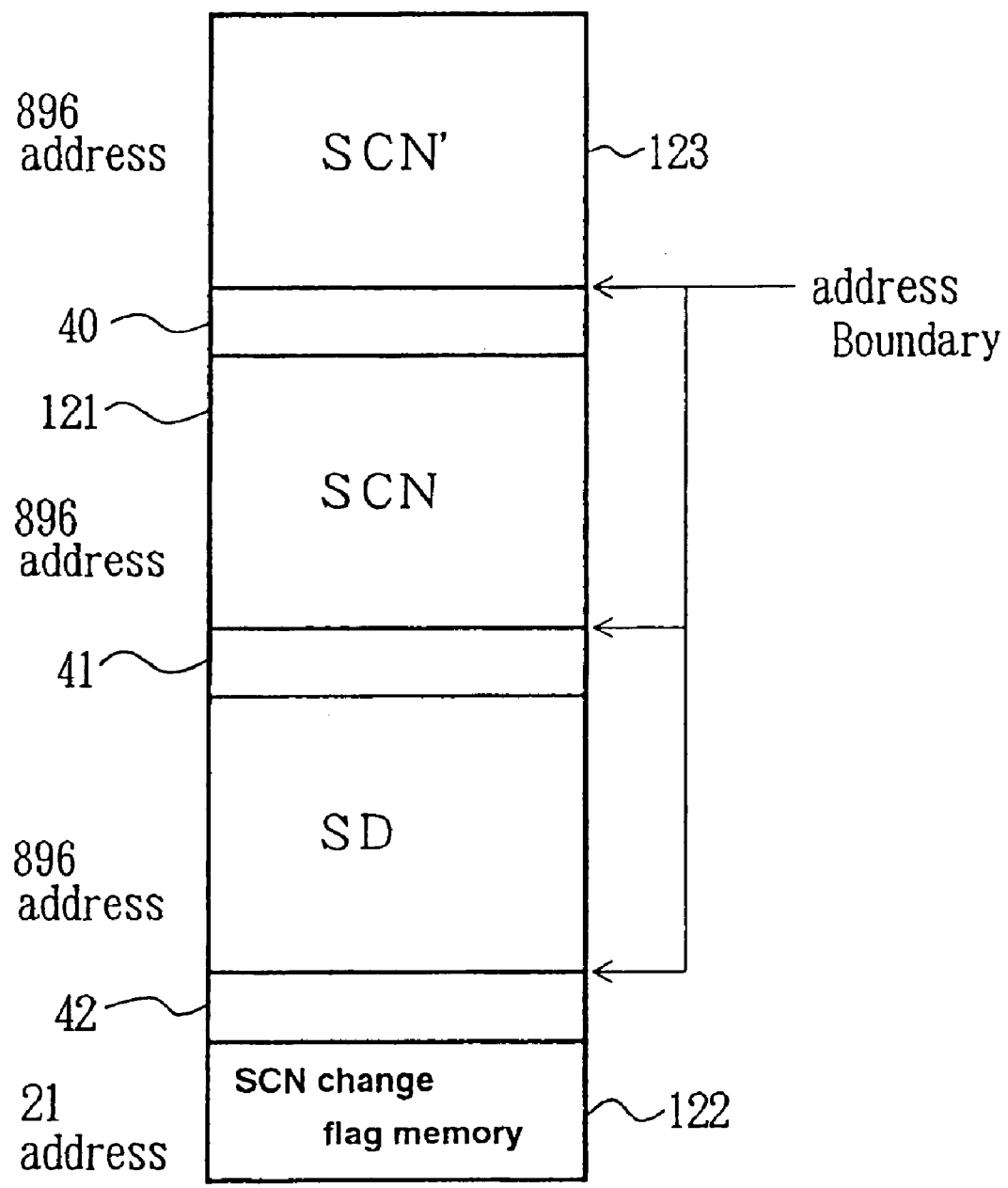
FIG. 4 is a diagram illustrating memory address regions in a SCAN memory 121, SCAN change flag memory 122, and protective SCAN memory 123.

FIG. 4 is a diagram illustrating the memory address regions of a SCAN memory 121, SCAN change flag memory 122, and protective SCAN memory 123. In FIG. 4, the memory address regions comprise empty regions 40, 41, 42 for aligning address boundaries.

Figure 5:
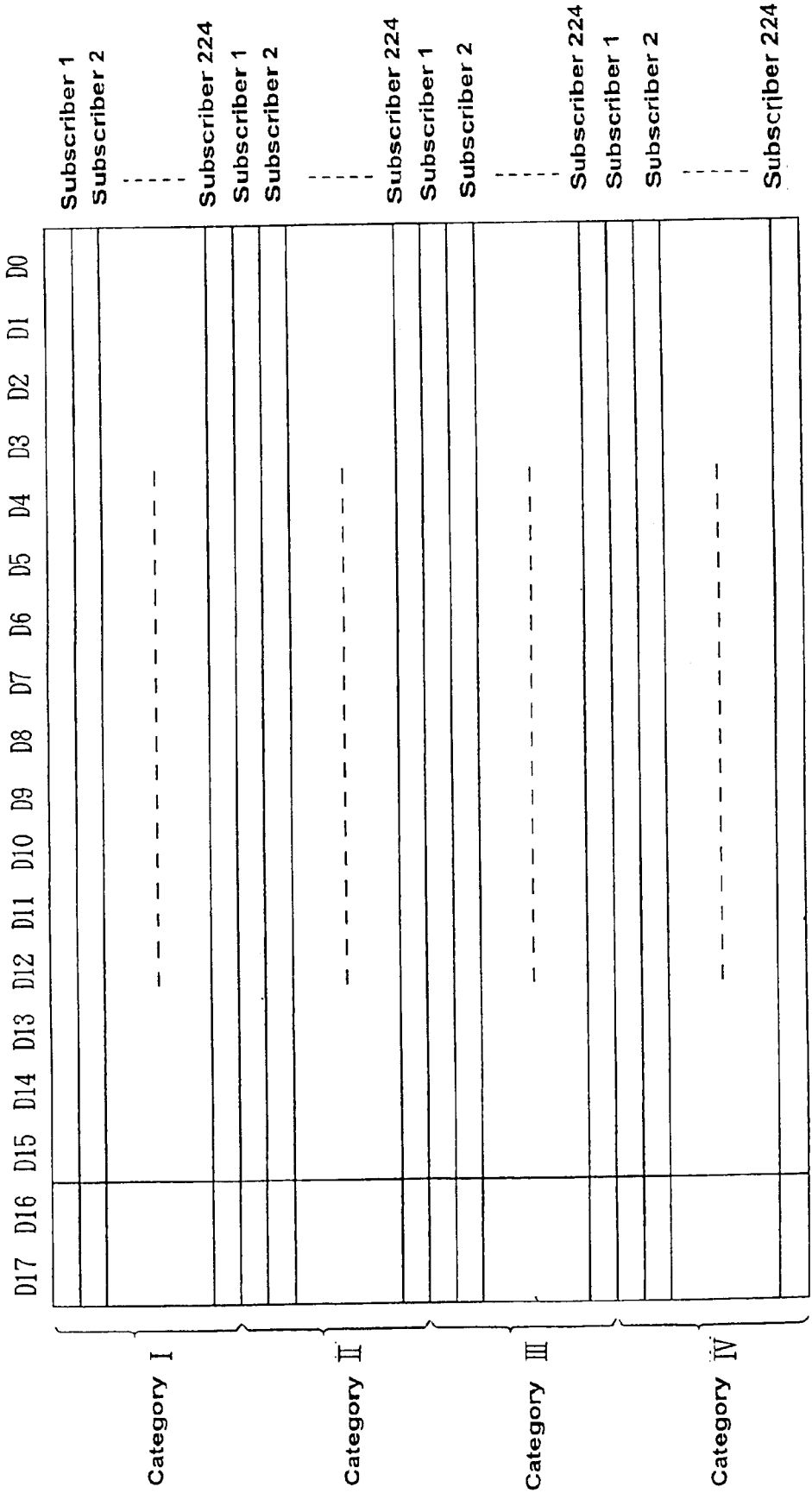
FIG. 5 is an example of a common composition for a SCAN memory 121 and a protective SCAN memory 123.

FIG. 5 shows an example of a composition applicable to both the SCAN memory and the protective SCAN memory 123. The data is divided into categories I to IV, which each respectively comprise regions for 224 subscribers in this embodiment. D16 and D17 are protective counters 108.

In categories I to IV described above, category I contains DLC-NTE synchronization bits for the subscriber lines. Category II contains subscriber line transmission quality information, but is irrelevant if no category I synchronization bit has been established.

Category III represents information from the terminal device NTE, and it contains information such as terminal-NTE synchronization bits, the terminal device NTE power supply state, and the like. Category IV contains DLC-NTE maintenance transmission bits. This is also irrelevant if no category I synchronization bit has been established.

Figure 6:
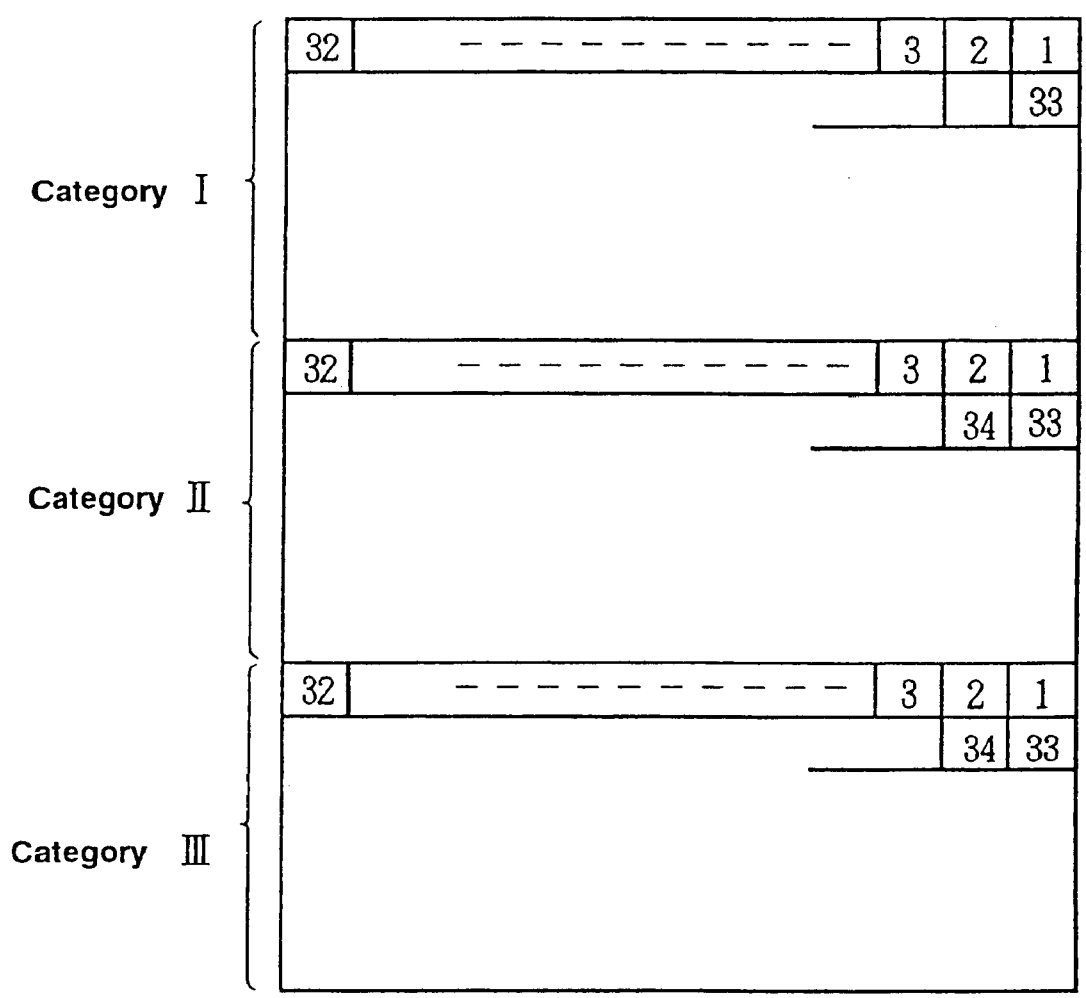
FIG. 6 is an example of a composition for a SCAN change flag memory 122.

FIG. 6 is a compositional example of the SCAN change flag memory 122. It is provided for categories I–III of the SCAN memory 121, and the numerals 1, 2, 3, . . . indicate subscriber numbers, a change flag "0" or "1" being set in the position of the corresponding subscriber number in accordance with the mode of implementation illustrated in FIG. 1.

As described above, according to the present invention, by means of the SCAN flags alone, the firmware is able to detect the location of a change simply by observing periodically the SCAN change flags in the SCAN change flag memory 122, for all subscribers. This allows the firmware processing load to be reduced.

Here, in controlling the subscriber lines, it is necessary to monitor the subscriber line SCAN signal periodically in order to monitor responses, such as the start-up of Layer 1 of the subscriber line control, and to monitor faults in the subscriber line channels. There are many SCAN change flag bits to be monitored, and there is an inevitable tendency for the number of subscriber lines accommodated to rise further.

Figure 7:
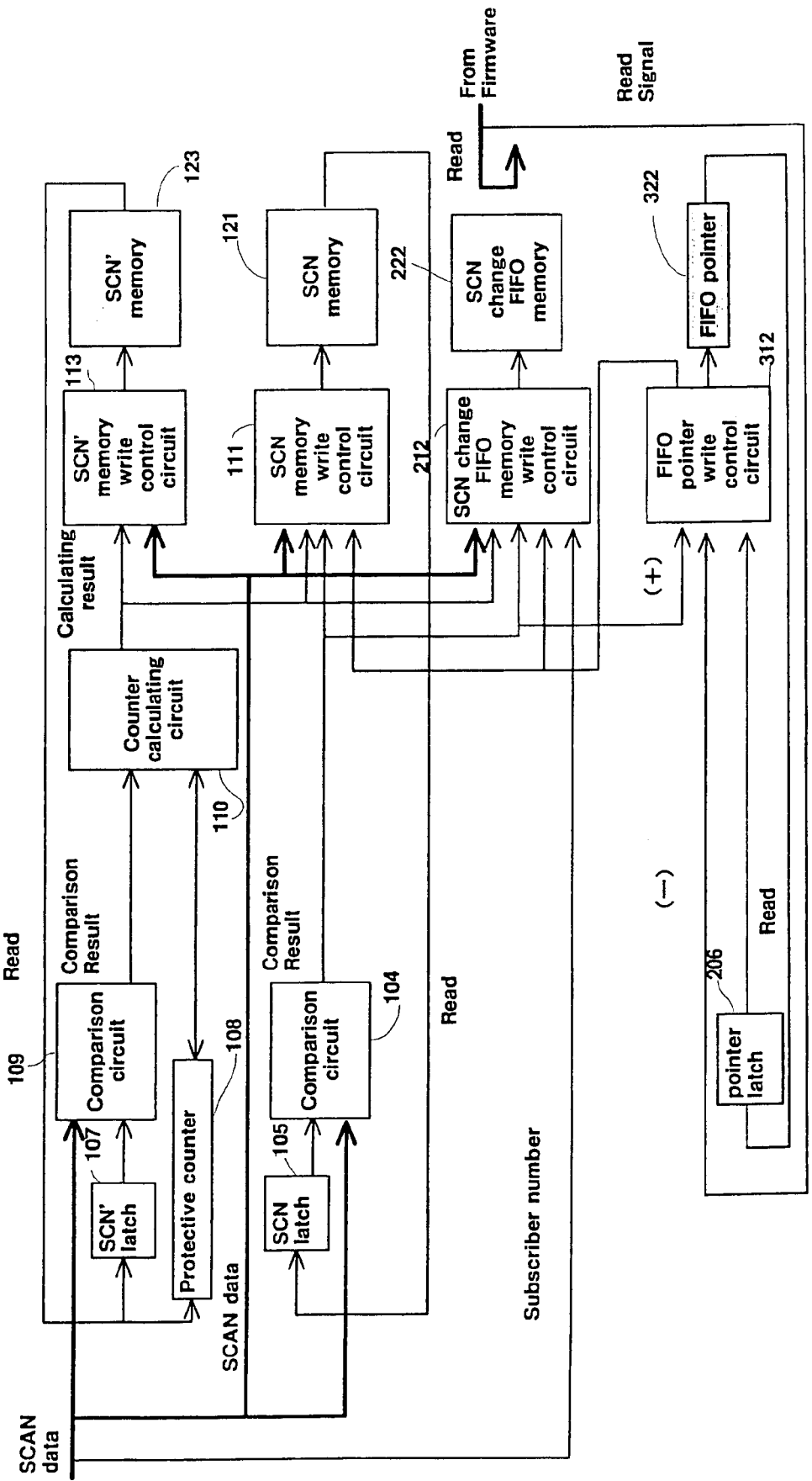
FIG. 7 is an example of a composition which enables the firmware processing load to be reduced.

In connection with this, in the mode of implementation illustrated in FIG. 1, there is also a tendency for the load in a steady state, which involves monitoring of the change flags only, to increase. Therefore, the mode of implementation illustrated in FIG. 7 is composed such that the firmware processing load can be reduced yet further. In FIG. 7, the points that differ from FIG. 1 are as follows. A SCAN change FIFO memory 222 and FIFO pointer 322 are provided in place of the SCAN change flag memory 122, a SCAN change FIFO memory write control circuit 212 and a FIFO pointer write control circuit 312 are provided in place of the SCAN change flag memory write control circuit 112, and a pointer latch circuit 206 replaces the flag latch circuit 106.

In FIG. 7, changes in the received SCAN signal data are detected in a similar manner to the composition in FIG. 1, and when a change is detected, the received SCAN signal data which has changed is written to the SCAN memory 121 and the SCAN change FIFO memory 222. The subscriber address corresponding to the changed SCAN signal data is written into the FIFO memory 222 in a position indicated by the FIFO pointer 322.

The FIFO pointer 322 indicates the position for writing into the FIFO memory 222 when the SCAN signal data next changes. When the firmware has read the FIFO memory 222, the FIFO pointer 322 is decremented (−), and when the SCAN signal data changes, it is incremented (+).

In the process of incrementing and decrementing the FIFO pointer 322, in response to the output from the FIFO pointer latch circuit 206, the FIFO pointer write control circuit 312 subtracts 1 when it receives a Read signal for the SCAN change FIFO memory 222 from the firmware, and it adds 1 when it receives a SCAN signal data change identification signal from the comparison circuit 104. If the FIFO memory 222 is full, then no data is written to the FIFO memory 222 and SCAN memory 121.

Figure 8:
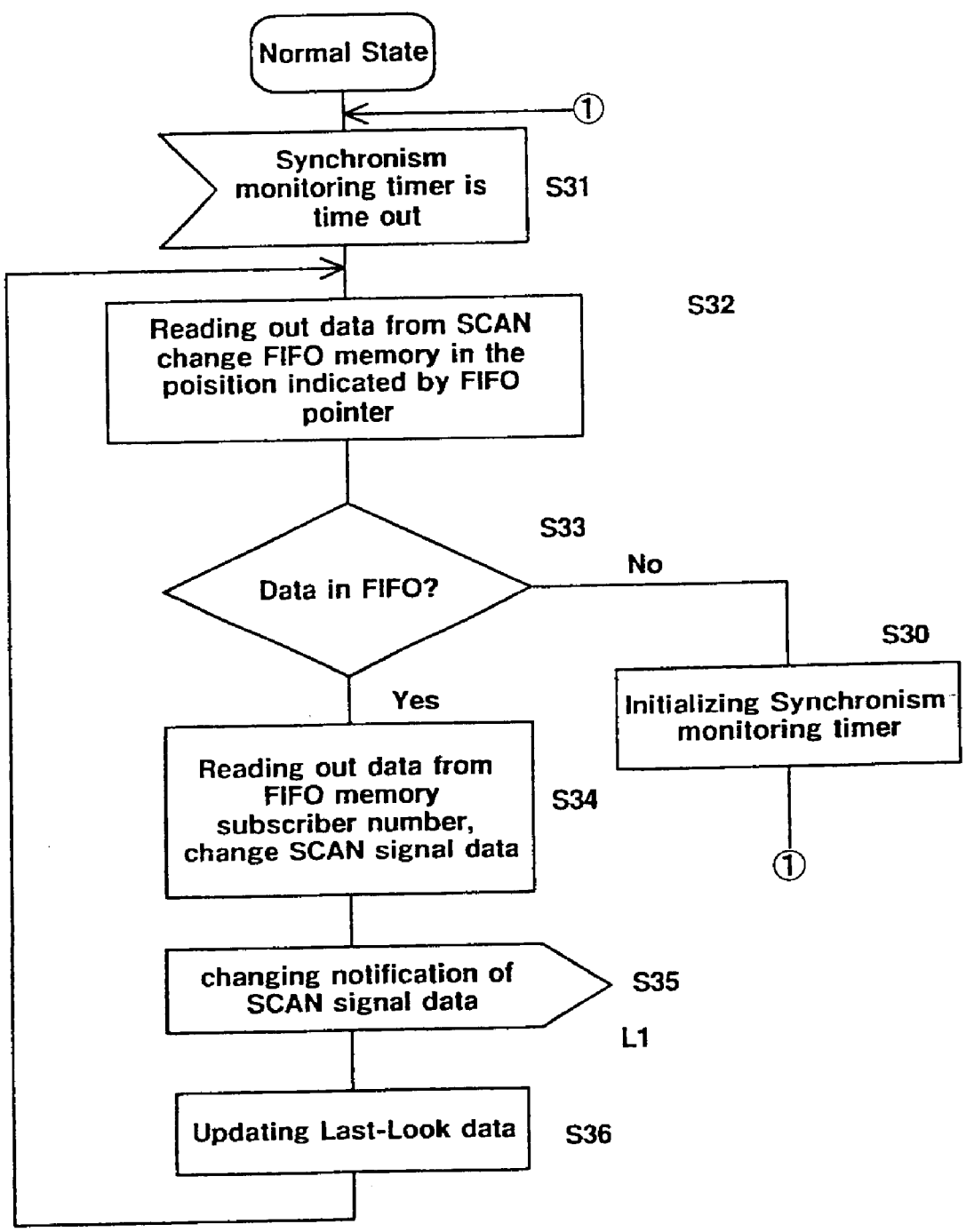
FIG. 8 is a diagram illustrating firmware processing corresponding to FIG. 7.

The firmware processing, on the other hand, follows the flowchart shown in FIG. 8. The FIFO pointer 322 is monitored periodically (steps S30, 31). If the FIFO pointer 322 is not "0", then this indicates that there has been a change in the SCAN signal data. Accordingly, in this case, the firmware reads out data from the SCAN change FIFO memory 222 in the position indicated by the FIFO pointer 322 (step S32).

The read-out processing described above is repeated until the FIFO pointer becomes "0" (step S33). The data read out from the FIFO memory (step S34) notifies the Layer 1 control program that the SCAN signal data has changed, and it initiates Layer 1 activation and fault processing (step S35). It then updates the Last-Look data (step S36).

Figure 9:
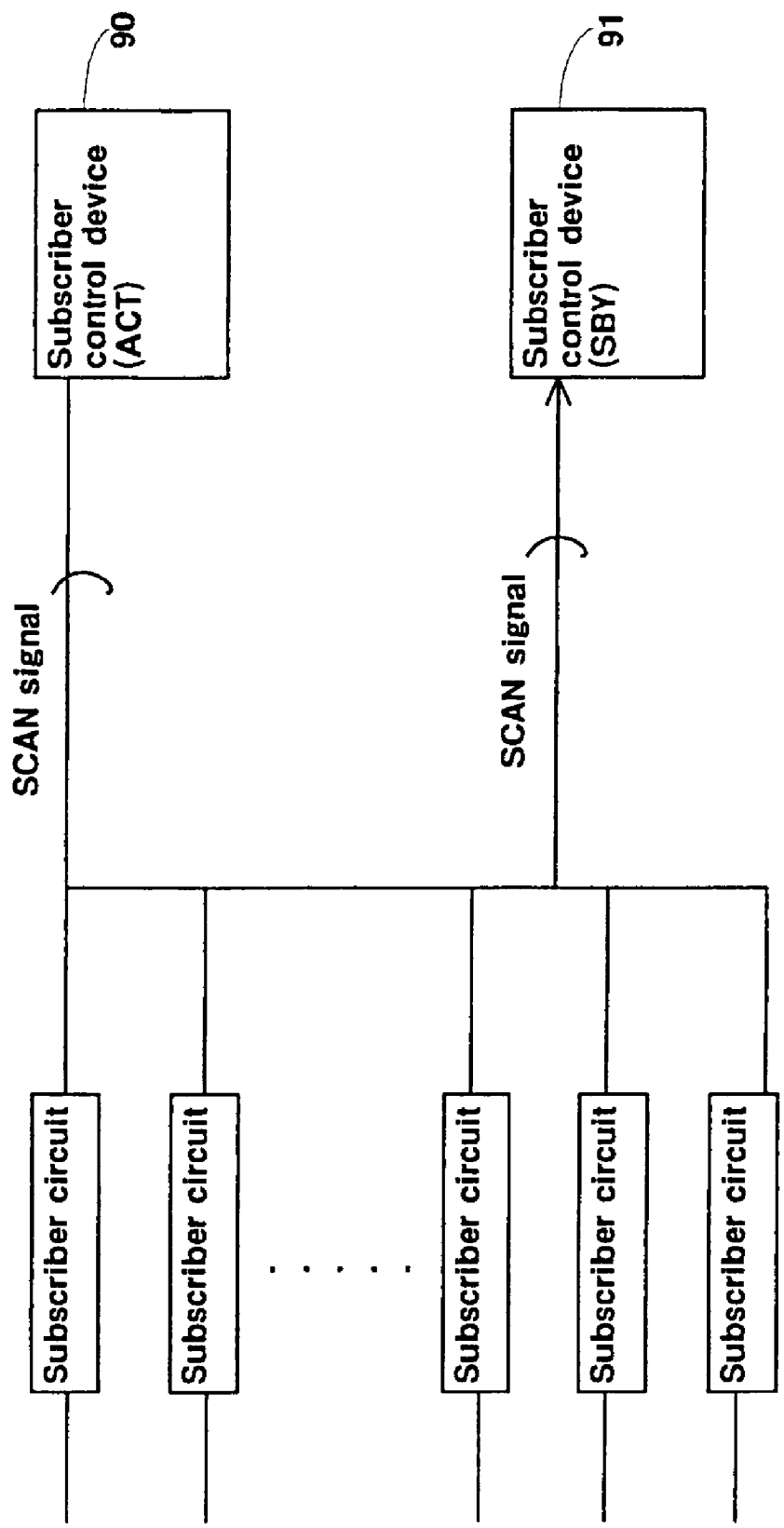
FIG. 9 is a diagram illustrating processing in a conventional subscriber line control device when systems are switched.

Here, the processing conducted when systems are switched in a conventional subscriber line control device system will be considered, with reference to FIG. 9. In a conventional subscriber line control device, firmware writes the SCAN memory Last-Look data into a further, duplex SCAN memory.

By this means, when the system is switched, the new ACT (currently active) system 91 should use the (Last-Look) data in the duplex memory written by the firmware in the previous ACT system 90 to continue the process of detecting changes in SCAN signal data in the new ACT system 91. In other words, in a conventional device, the SCAN signal is observed similarly for both ACT/SBY systems 90/91, as is the SCAN memory. Therefore, when switching systems, no problems arise in firmware processing.

However, in the present invention, as described previously, SCAN change flags are employed in response to the increase in the number of subscribers. Therefore, it is necessary for the SCAN signal to be carried over without leakage from the previous ACT system to the new ACT system.

Figure 10:
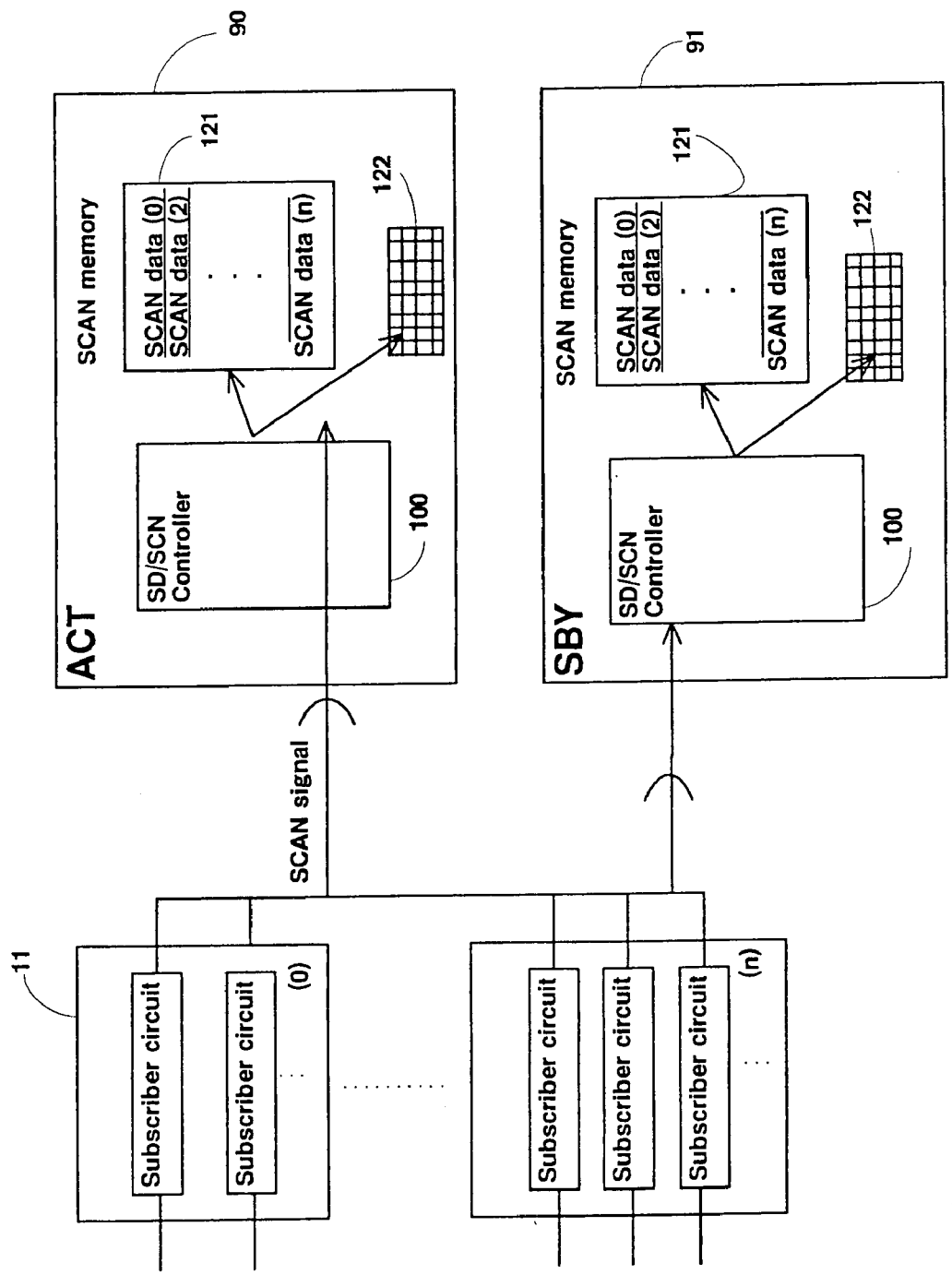
FIG. 10 is a block diagram of a mode of implementation whereby a SCAN signal is carried over from a previous ACT system to a new ACT system without leakage.

FIG. 10 illustrates an approximate compositional example for achieving this. As described previously in FIG. 1, when the SCAN signal data changes, the SCAN flag in the SCAN flag memory 122 is set to "1" and the SCAN memory 121 is updated. This operation is common to both the ACT system and the SBY system.

Figure 11:
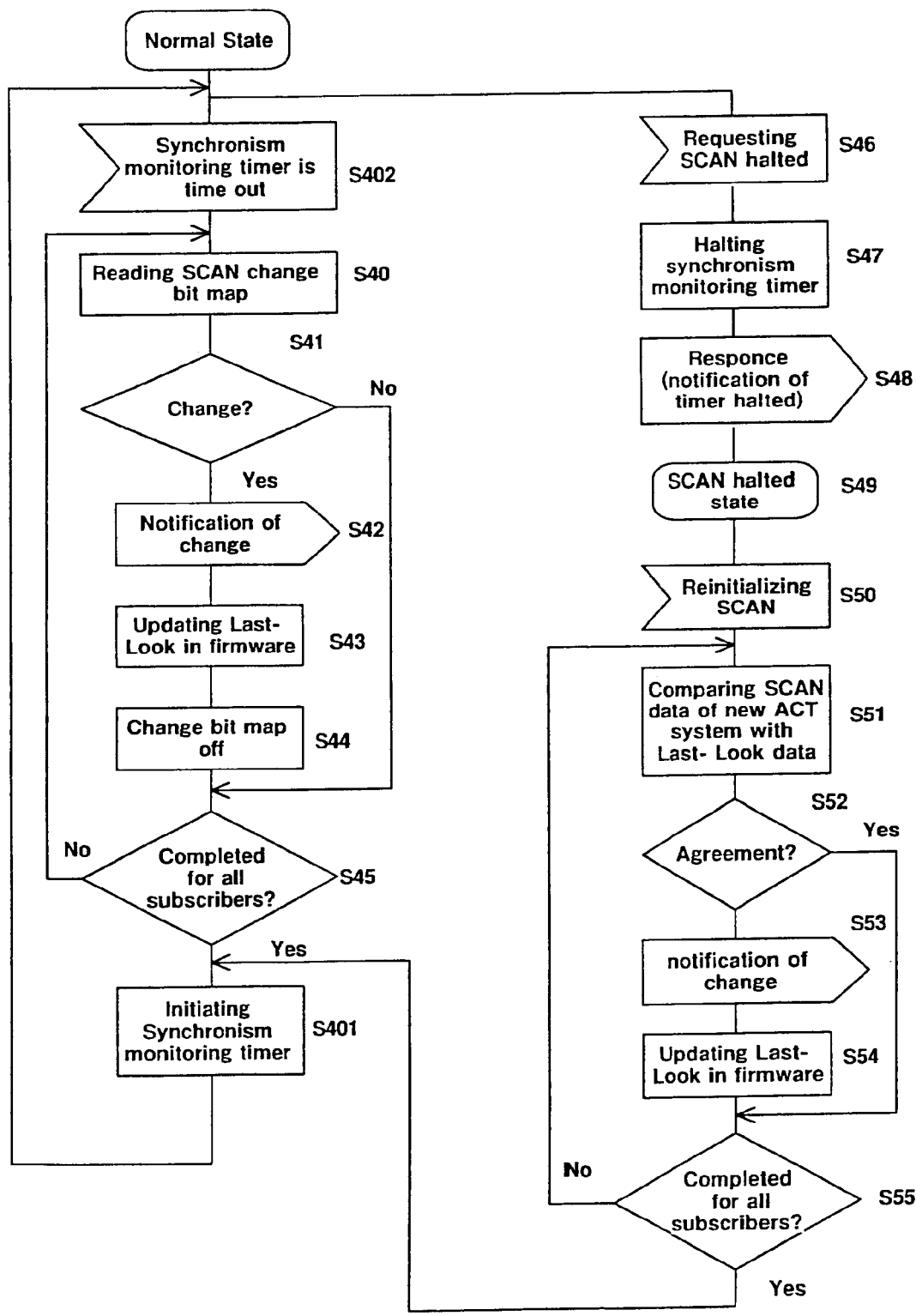
FIG. 11 is an operational flowchart illustrating operations in the ACT system in the mode of implementation in FIG. 10.
Figure 12:
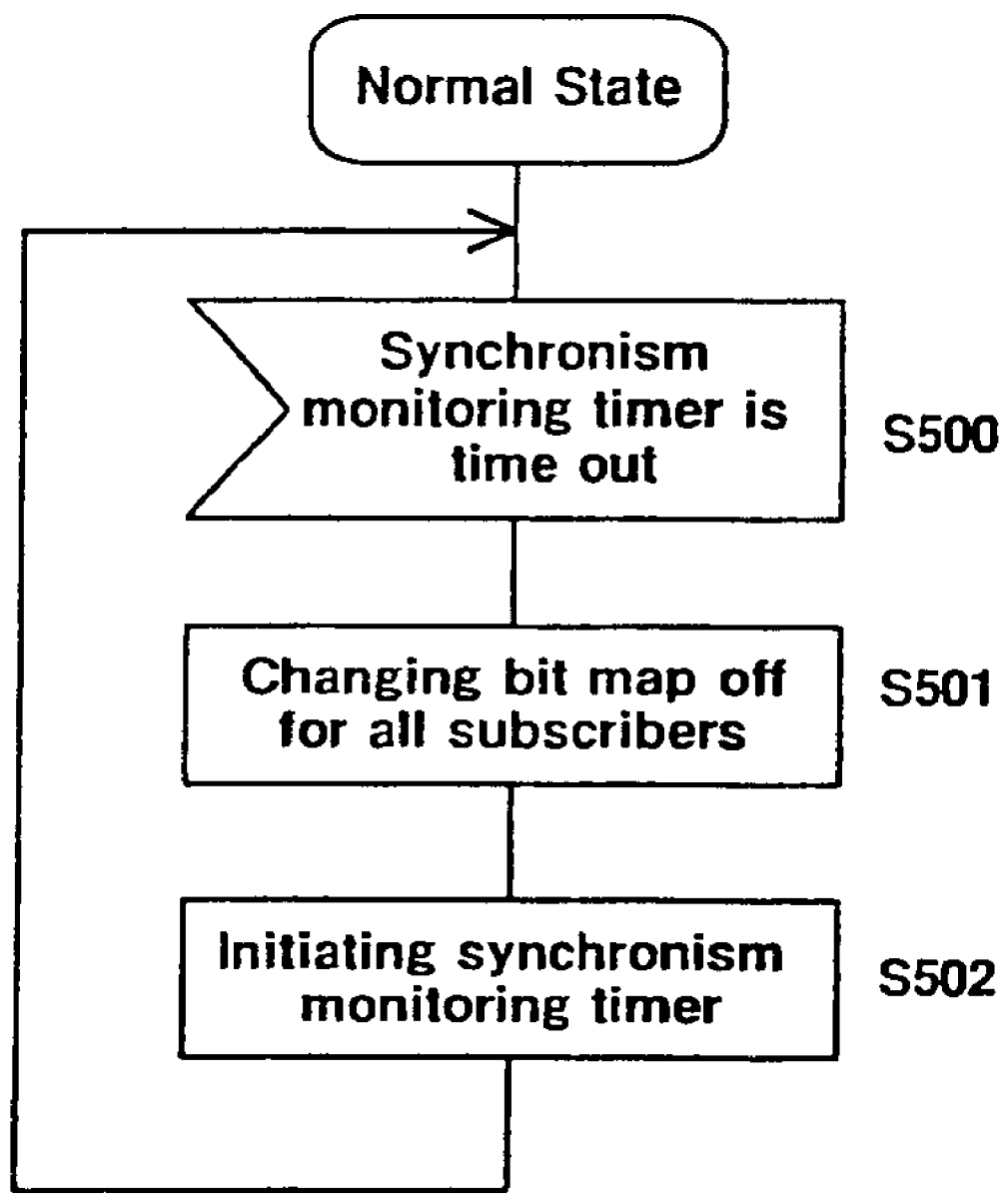
FIG. 12 is an operational flowchart illustrating operations in the SBY system in the mode of implementation in FIG. 10.

The operations conducted by the firmware are shown in FIG. 11 and FIG. 12. FIG. 11 shows the operations in the ACT system and FIG. 12 shows the operations in the SBY system. In FIG. 11, a monitoring timer is activated and periodically (step S401, 402), the SCAN change flag memory 124 is read out (step S40), and it is determined whether or not there has been a change (step S41).

The changed contents in the SCAN memory 121 corresponding to a SCAN change flag of "0" in the SCAN change flag memory 124 is transmitted to the firmware (step S42). Thereby, the firmware initiates the Layer 1 control program and implements fault processing.

On the hardware side, moreover, the duplex memory 121 (see FIG. 10) in the ACT and SBY systems is updated by writing in the details read out from the SCAN memory 121 as Last-Look data (step S43). Thereupon, the SCAN change flag is set to 1 (off) (step S44). These operations are completed for all subscribers (step S45).

No processing is conducted with respect to locations in the SCAN change flag memory 124 where the SCAN change flag is "1". Therefore, the Last-Look data is not updated, either.

The operation of the SBY system is shown in FIG. 12. Periodically (step S500, 502), the SCAN change flags for all subscribers are set to "0". In this case, the SCAN change flags are set to "0" unconditionally, whether they have a value of "1" or "0" (step S501). Therefore, the contents of the SCAN memory 121 are not read out. Next, the operations conducted when systems are switched is described. In FIG. 11, in the ACT system, prior to system switching the periodic processing is halted, and hence monitoring of the SCAN change flags is halted (step S46–49).

The step of halting the monitoring of SCAN change flags is conducted by means of the ACT system issuing a SCAN halt request to the SBY system (step S46), whilst simultaneously halting the synchronism monitoring timer (step S47). The SBY system notifies the ACT system that it has halted (step S48). Thereby, the reception of SCAN signal data by the ACT system is halted.

When the SCAN is reinitiated (step S50), the Last-Look data in the duplex SCAN memory 121 of the previous ACT system 90 is compared with the data in the SCAN memory 121 of the new ACT system 91, and a disparity check is carried out for all subscribers (steps S51–55).

No processing is implemented if this data comparison (steps S51, 52) produces an agreement (step S52: yes). If it produces a disagreement, then a SCAN signal change notification is transmitted to the Layer 1 control program (step S53), and the Last-Look data is rewritten and updated (step S54). The Layer 1 control program initiates Layer 1 activation and fault processing on the basis of the transmitted SCAN signal change notification. By means of the duplex configuration, processing can be conducted for multiple channels.

Figure 13:
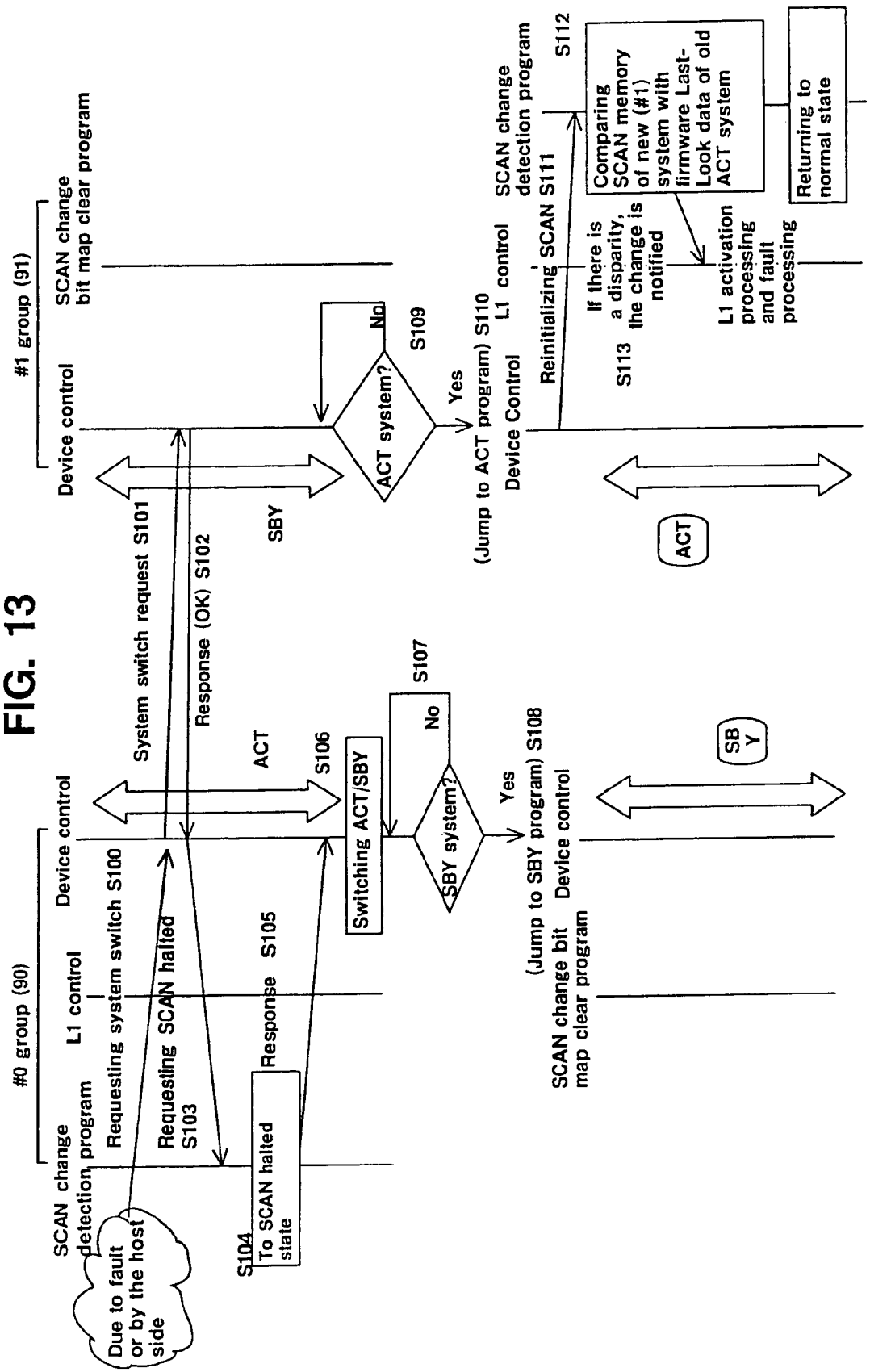
FIG. 13 is a diagram illustrating a sequence of firmware operations when systems are switched in the mode of implementation in FIG. 10.

FIG. 13 illustrates the operational sequence carried out by the firmware when switching systems. Taking system #0 as the current ACT system, when a system switch request is generated due to a fault, or by the host side (step S100), the system switch request is transmitted from system #0 to SBY system #1 (step S101). In reply, #1 transmits a confirmatory response (step S102).

In the mode of implementation shown in FIG. 10 above, it is necessary to clear the SCAN change flags for all subscribers periodically. In response to this, in system #0, a SCAN halt request is output by the device control program to the SCAN change detection program (step S103).

Consequently, the SCAN change detection program assumes a SCAN halted state (step S104), and a halt notification is sent to the device control program (step S105). The device control program accordingly switches the ACT and SBY systems (step S106). Thereupon, system #0 identifies that it is now the SBY system (step S107), and implements SBY programs (step S108).

System #1, on the other hand, after sending a response (step S102) to the system switch request from system #0

(step S101), identifies that it is now the ACT system (step S109), and implements ACT programs (step S110).

In accordance with this implementation of ACT programs, the device control program sends a SCAN reinitiation command to the SCAN change detection program (step S111). In the SCAN change detection program, the SCAN memory 121 of the new hardware (#1) system is compared with the firmware Last-Look data of the previous ACT system (#0) (step S112). If there is a disparity, the change is indicated to the Layer 1 control program, and Layer 1 activation processing and fault processing are implemented (step S113). If there is no disparity, it switches to a normal state.

In the mode of implementation shown in FIG. 10, it was necessary to clear the change flags for all subscribers. Therefore, in the composition shown in FIG. 14, which illustrates a further mode of implementation, in order that duplex system switching is possible even if a clearing process is not conducted on the SBY side, the hardware comprises an additional mode whereby SCAN change flags are provided for each subscriber when the SCAN memory 121 changes, and if the hardware detects a change, the SCAN memory 121 is updated unconditionally.

Figure 14:
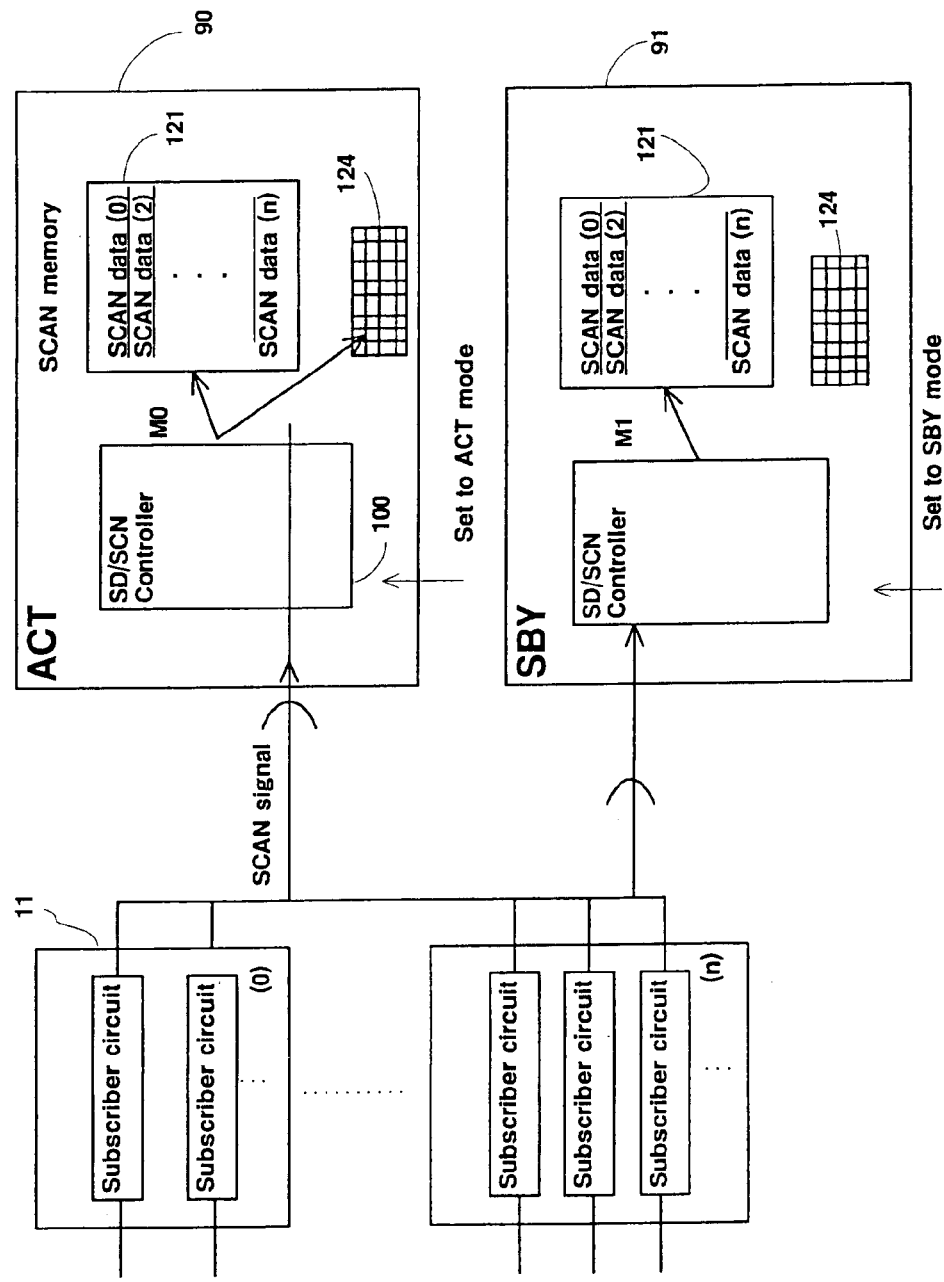
FIG. 14 is a block diagram of a mode of implementation whereby switching of duplex systems is possible, without conducting a clearing process in the SBY system.

In other words, as shown in FIG. 14, the SCAN control section 100 is provided with an ACT/SBY mode reception circuit. In the case of the ACT system, the SCAN change is operated in a reception mode using change flags, and the corresponding bits in the corresponding SCAN change flag memory 124 are rewritten (mode MO), as described in the mode of implementation in FIG. 10.

However, in the SBY system, an additional mode M1 is provided, whereby the SCAN memory 121 is updated unconditionally when there is a point of change in the SCAN.

Figure 15:
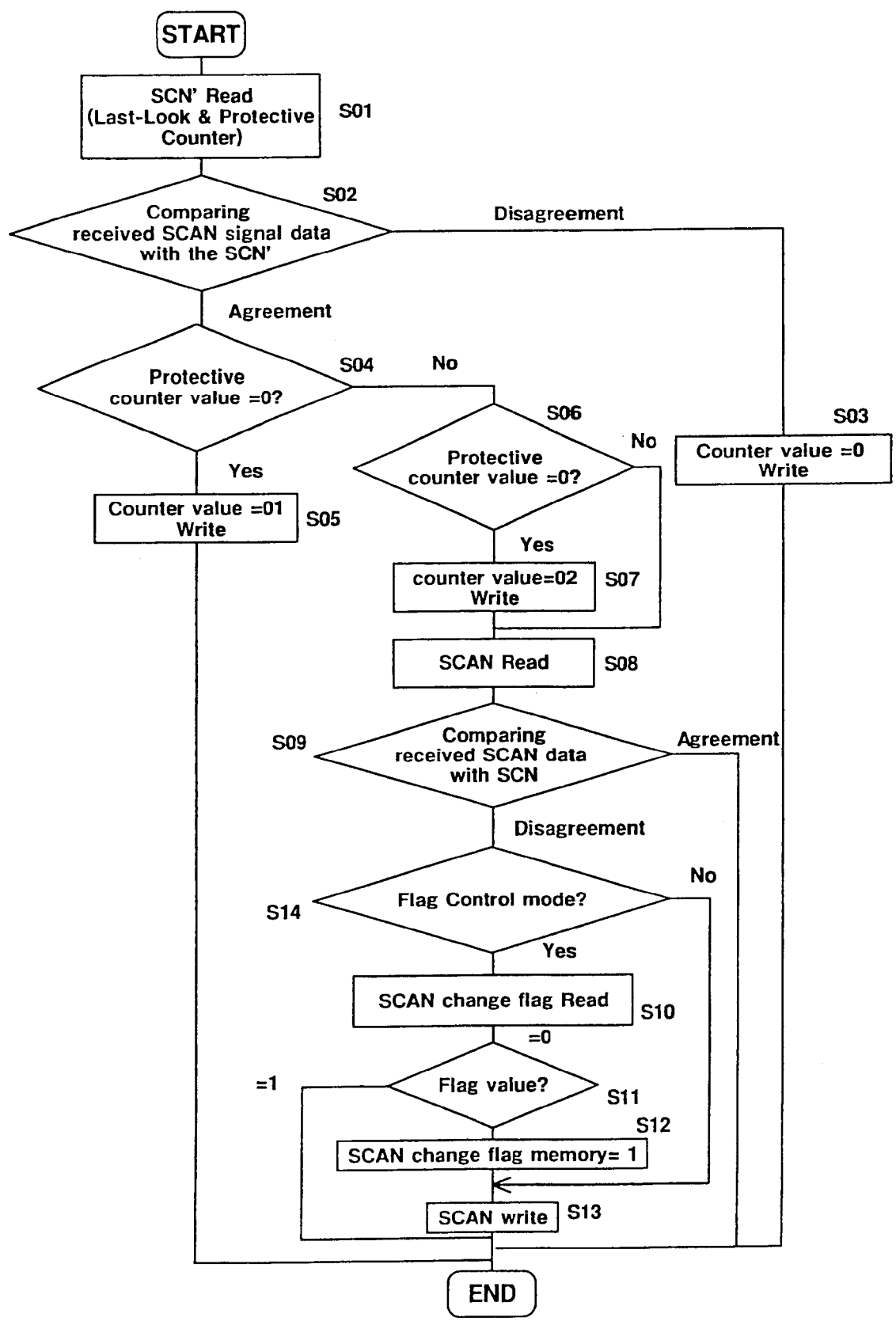
FIG. 15 is a flowchart of hardware operations in the mode of implementation in FIG. 14.
Figure 16:
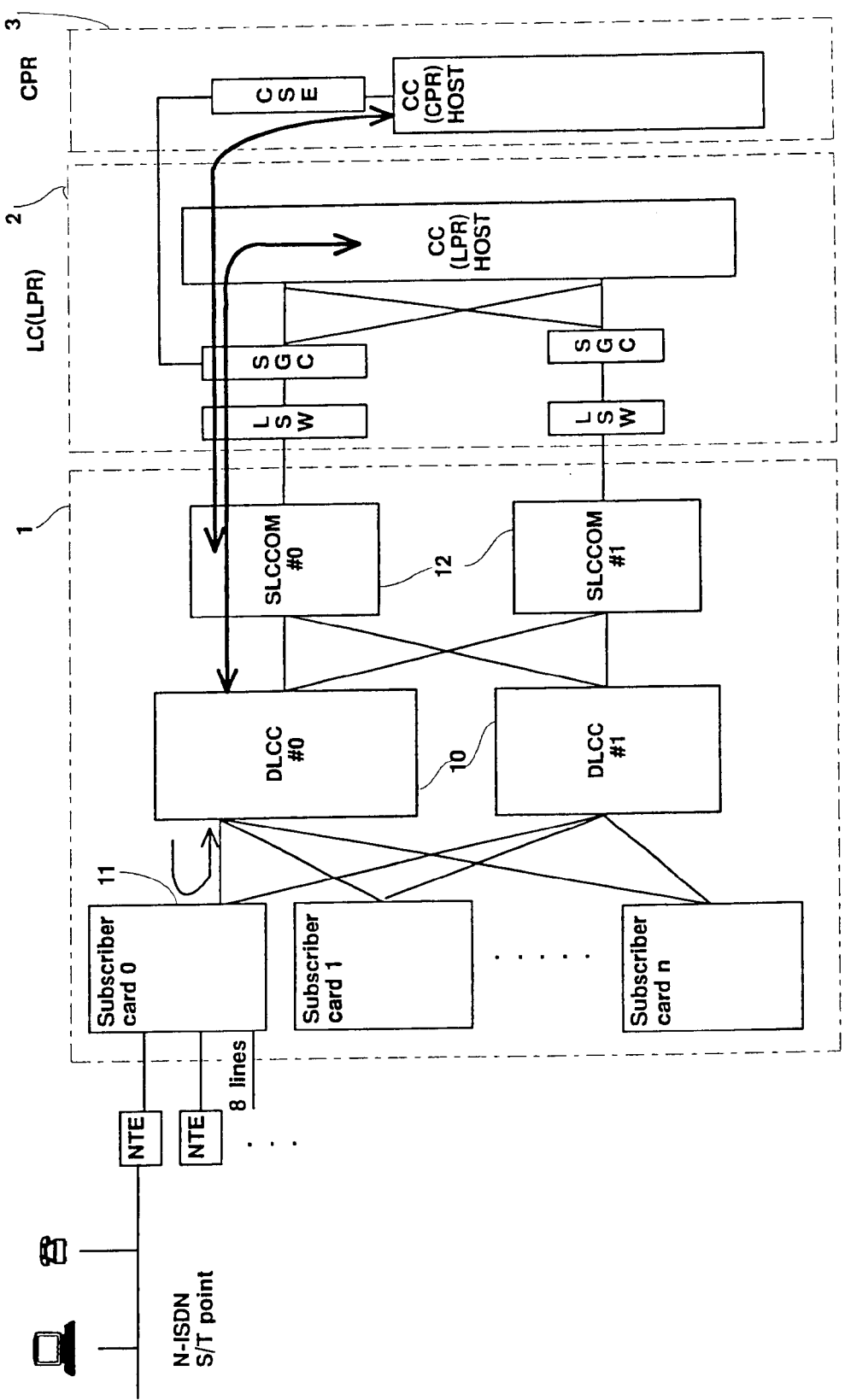
FIG. 16 is a compositional example of a subscriber control system incorporating a subscriber line control device.

FIG. 15 is a flowchart of the aforementioned hardware operations; a procedure for determining the flag control selection mode (step S14) has been added to the operational procedure corresponding to the mode of implementation in FIG. 1. In step S14, in the case of flag control mode, in other words, mode M1, the SCAN memory is updated unconditionally when the hardware detects a change.

As regards the firmware operations, the ACT side is the same as in the mode of implementation in FIG. 10, whilst the processing on the SBY side involves simply waiting for system switching, since it is set to mode M1 whereby the SCAN memory 121 is updated unconditionally.

When a system switch arises, the operations conducted by the previous ACT system are the same as in the mode of implementation in FIG. 10, whilst on the new ACT side, the new ACT hardware is switched from SBY mode to ACT mode. Thereupon, the contents of the Last-Look data in the SCAN memory written into the duplex memory in the previous ACT system are compared with the SCAN memory 121 in the new hardware. Subsequent processing is similar to that in the mode of implementation in FIG. 10.

The hardware of the system that has become the new SBY system is set to SBY mode, and this system then waits until it is next switched to ACT. By means of this mode of implementation, the amount of processing in the SBY program can be reduced.

As described in accordance with the aforementioned modes of implementation, according to the present invention, the problem of increased firmware processing load when the number of subscribers rises is resolved, and the firmware processing load can be reduced regardless of increases in the number of subscriber lines.

Moreover, in the duplex redundancy configuration (#0, #1) of the subscriber line control device, it is possible to provide a subscriber line control device whereby a SCAN signal can be carried over to a new ACT system without leakage, when systems are switched.

What is claimed is:

1. A subscriber line control device connected to a plurality of subscriber line circuits, comprising:
   a hardware including,
      a scan memory recording signal data for each of the plurality of subscriber line circuits,
      a comparator comparing received signal data of a subscriber line circuit with signal data recorded in the scan memory,
      a counter circuit counting times of disagreement between the compared signal data of the subscriber line circuit,
      a flag memory storing flags, indicating a change of signal data for each of the plurality of subscriber line circuits, and
      a memory write controller controlling to write the received signal data for updating the signal data previously stored in the scan memory and a flag, the flag indicating in the flag memory that the signal data have changed in the scan memory, when the times of disagreement between the compared signal data of the subscriber line circuit, counted by the counter circuit, reaches a predetermined number; and
   a firmware periodically monitoring the flag memory to detect the presence of the flag and reading out the signal data from the scan memory, of a subscriber line circuit corresponding to the detected flag.

2. The subscriber line control device according to claim 1, wherein the detected flag is deleted when the firmware reads out the signal data from the scan memory, and the signal data are not updated in the scan memory if the flag has not been deleted.

3. The subscriber line control device according to claim 1, wherein the hardware further includes a FIFO memory, which indicates the location in the scan memory, where the received signal data are to be written when the memory write controller is to next write the signal data into the scan memory.

4. The subscriber line control device according to claim 3, wherein the location indicated in the FIFO memory is decremented when the firmware reads out the signal data from the scan memory, and is incremented when the comparator detects disagreement between the compared signal data of the subscriber line circuit.

5. A subscriber line control device connected to a plurality of subscriber line circuits, comprising:
   a hardware having a pair of active and standby systems and including in each of the active and standby systems,
      a scan memory recording signal data for each of the plurality of subscriber line circuits,
      a comparator comparing received signal data of a subscriber line circuit with signal data recorded in the scan memory,
      a counter circuit counting times of disagreement between the compared signal data of the subscriber line circuit,
      a flag memory storing flags, indicating a change of signal data for each of the plurality of subscriber line circuits, and
      a memory write controller controlling to write the received signal data for updating the signal data previously stored in the scan memory and a flag, the flag indicating in the flag memory that the signal data have changed in the scan memory, when the times of disagreement between the compared signal data of the subscriber line circuit, counted by the counter circuit reaches a predetermined number, wherein the memory write controller of the standby system periodically deletes flags written in the flag memory; and a firmware periodically monitoring the flag memory of the active system to detect the presence of the flag and reading out the signal data from the scan memory, of a subscriber line circuit corresponding to the detected flag.

6. A subscriber line control device connected to a plurality of subscriber line circuits, comprising:

a control circuit including a scan memory recording signal data for each of the plurality of subscriber line circuits, a comparator comparing received signal data of a subscriber line circuit with signal data recorded in the scan memory, a counter circuit counting times of disagreement between the compared signal data of the subscriber line circuit and signal data recorded in the scan memory, a flag memory storing flags, indicating a change of signal data for each of the plurality of subscriber line circuits, and a memory write controller to control the writing of signal data into the scan memory and to control the writing of flags into the flag memory; and firmware periodically monitoring the flag memory to detect the presence of the flag and reading out the signal data from the scan memory of a subscriber line circuit corresponding to the detected flag, wherein when times of dissagreament between the compared signal data of the subscriber line circuit, counted by the counter circuit, reaches a predetermined number, the memory write controller controls the scan memory to write the received signal data thereby updating the signal data previously stored therein, and controls the flag memory to indicating that the stored signal data have changed.

* * * * *

UNITED STATES PATENT AND TRADEMARK OFFICE
CERTIFICATE OF CORRECTION

PATENT NO.      : 6,556,675 B2
DATED           : April 29, 2003
INVENTOR(S)     : H. Koga It is certified that error appears in the above-identified patent and that said Letters Patent is hereby corrected as shown below:

<u>Title page,</u>
Item [22], Filing Date:, should read -- May 19, 1998 --.

Signed and Sealed this

Second Day of September, 2003

JAMES E. ROGAN
*Director of the United States Patent and Trademark Office*